Patented Dec. 4, 1934

1,983,184

UNITED STATES PATENT OFFICE 1,983,184

METHOD OF MAKING BEARINGS AND BEARING MATERIALS

Charles F. Noftzger, Chicago, Ill.

No Drawing. Application February 12, 1932,
Serial No. 592,659

5 Claims. (Cl. 308—242)

The main objects of my invention are:
1. To provide a material having high anti-friction and wearing qualities, whereby it is well adapted for bearings for all classes of machinery, including high speed machinery.
2. To provide a bearing which is self-lubricating, vey durable, and capable of sustaining heavy loads.
3. To provide a bearing having these advantages, which can be manufactured very economically.
4. To provide an improved method of making bearings and bearing material.
5. To provide a new and improved material for use in molding bearings and the like.

Objects pertaining to details and economies of my invention will definitely appear from the description to follow. The invention is defined in the claims.

The material and bearing of this application are further developments of and improvements upon the material and bearing of my Patent No. 1,791,834, dated February 10, 1931, in which I disclose a highly desirable bearing material and bearing consisting of pulverulent sericite schist and an infusible phenolic condensation product and other materials as a binder.

I have improved upon the material and bearing of that patent by the addition to the composition of a pulverulent metal such as lead, zinc or bronze, a combination of metals, and/or a wax such as carnauba. The metals are introduced in a pulverulent or finely divided state and serve to conduct the heat from the bearing. The wax greatly facilitates the manufacture and molding, and also serves to counteract in a measure the abrasive quality of the phenolic resin when that material is used as a binder. The sericite schist is a very satisfactory anti-friction material, but in producing the bearings it is intimately associated with the phenolic resin, and the wax greatly assists in getting the molded product out of the mold.

I also preferably add a small amount of cotton flock which is particularly desirable where the bearing is in the form of a relatively thin bushing.

The materials, when sericite schist, metal, the binder, wax, and flock are used, are thoroughly mixed and molded under pressure and subjected to heat, that is, where the resin type of binders are employed requiring heat for the proper molding thereof.

The following fomulæ have been found highly desirable, the percentages being by weight:

| | Per cent |
|---|---|
| 1. Resin | 18 |
| Sericite | 56 |
| Carnauba wax | 4 |
| Lead dust | 22 |

| | Per cent |
|---|---|
| 2. Resin | 20 |
| Sericite | 61 |
| Zinc | 15 |
| Carnauba wax | 4 |

| | Per cent |
|---|---|
| 3. Resin | 19 |
| Sericite | 58 |
| Zinc dust | 14 |
| Carnauba wax | 5 |
| Cotton flock | 4 |

The last formula has proved excellent for use in shackle bolt bearings. The relative amount of metal and resin or other binder depends to a considerable extent upon the duty required of the finished bearing.

A preferred composition by volume for my bearing material consists of:

| | Parts |
|---|---|
| Pulverulent metal | 5 |
| Sericite schist | 4 |
| Binder | 1½ |
| Flock | ¾ |
| Wax | 1¾ |

The preferred method of making bearings and bearing material in accordance with my invention is as follows: The wax is melted and mixed with the sericite schist. This mixture is thoroughly cooled and then pulverized in a grinding machine. The metal, such as lead, is pulverized and reduced to very small particles by any suitable method, preferably such as passing through a 200 mesh screen. The lead dust is thoroughly mixed with the pulverulent wax and sericite schist and the binder which has previously been dissolved with a solvent, such as alcohol, amyl acetate, or the like. The entire mixture is then subjected to heat to eliminate the solvent by evaporation, after which the resulting mass is reduced to comminuted or pulverulent form by grinding. At this state, the bearing material is in the form of finely divided particles like sand and is ready to be molded into a bearing, or the like, under heat and pressure.

In certain of the claims I use the term "bearing metal" which term includes the well known bearing metals, such as lead, Babbitt metal, bronze, and other like bearing alloys. The wax may be paraffin, carnauba and the like and/or any material having the properties of wax. While I prefer to use a phenolic binder, any suitable binder may be used.

In the above description I have mentioned lead, zinc, and bronze as being suitable metals. Other metals such as brass and Babbitt and their alloys, and other metals and alloys may be used. My improved bearings have very excellent wearing and anti-friction qualities, do not require lubricant, may be used on high speed machinery without becoming overheated, and also have the advantage of being very economically produced.

It is obvious that various changes and modifications may be made in the details of construction and design of the above specifically described embodiments of my invention without departing from the spirit thereof, such changes and modifications being restricted only by the scope of the following claims.

Having thus described my invention, what I claim as new and desire to secure by Letters Patent is:

1. The method of making bearings, which comprises melting wax, mixing the melted wax with sericite schist, cooling the mixture, pulverizing the product, mixing pulverized lead with the pulverized mixture of wax and sericite schist, dissolving a phenolic binder with a solvent, mixing the dissolved binder with the pulverized material, heating to evaporate the solvent, pulverizing the resulting product, and molding under heat and pressure.

2. The method of making bearings, which comprises melting wax, mixing the melted wax with sericite schist, cooling the mixture, pulverizing the product, mixing pulverized lead with the pulverized mixture of wax and sericite schist, dissolving a binder with a solvent, mixing the dissolved binder with the pulverized material, heating to evaporate the solvent, pulverizing the resulting product, and molding.

3. The method of making bearing material, which comprises mixing wax and sericite schist, cooling, and comminuting, mixing the product with a pulverulent bearing metal and a binder, and pulverizing the resulting product.

4. The method of making moldable material for bearings, which comprises mixing molten wax with sericite schist, cooling, and comminuting, mixing the product with pulverulent metal and a dissolved binder, eliminating the solvent in the binder by evaporation, and pulverizing the resulting product to the consistency of fine sand.

5. The method of making moldable material for bearings, which comprises mixing molten wax with sericite schist, cooling, and comminuting, mixing the product with pulverulent metal and a dissolved binder, eliminating the solvent in the binder, and pulverizing the resulting product.

CHARLES F. NOFTZGER.